United States Patent [19]

Kinjo

[11] Patent Number: 4,530,012
[45] Date of Patent: Jul. 16, 1985

[54] TRACKING CONTROL SYSTEM FOR MAGNETIC VIDEO RECORDING AND/OR REPRODUCING APPARATUS WITH TRACKING SIGNAL POSITIONS STAGGERED WITH RESPECT TO THE POSITIONS OF TRACKING SIGNALS ON ADJACENT TRACKS

[75] Inventor: Hisao Kinjo, Yokohama, Japan

[73] Assignee: Victor Company of Japan, Ltd., Kanagawa, Japan

[21] Appl. No.: 527,203

[22] Filed: Aug. 29, 1983

Related U.S. Application Data

[63] Continuation of Ser. No. 214,762, Dec. 9, 1980, abandoned.

[30] Foreign Application Priority Data

Dec. 10, 1979 [JP] Japan ................... 54-160142

[51] Int. Cl.³ ............ G11B 21/10; H04N 9/491; H04N 5/782
[52] U.S. Cl. .................... 358/327; 360/77
[58] Field of Search ............ 358/8, 128.6, 327, 328; 360/75–77, 84, 107, 109; 369/43

[56] References Cited

U.S. PATENT DOCUMENTS

| | | | |
|---|---|---|---|
| 3,958,271 | 5/1976 | Sumiyushi | 360/75 X |
| 3,964,094 | 6/1976 | Hart | 360/77 |
| 4,092,682 | 5/1978 | Andrews, Jr. et al. | 360/77 |
| 4,104,684 | 8/1978 | Wakani et al. | 360/77 X |
| 4,120,008 | 10/1978 | Metzger et al. | 360/70 |
| 4,141,047 | 2/1979 | Kambara et al. | 360/77 |
| 4,141,048 | 2/1979 | Kubota et al. | 360/77 |
| 4,148,083 | 8/1979 | Watanabe | 360/77 |
| 4,183,067 | 1/1980 | Kihara et al. | 360/75 |
| 4,247,741 | 1/1981 | Tatsuguchi et al. | 360/77 X |

FOREIGN PATENT DOCUMENTS

| | | |
|---|---|---|
| 2447408 | 5/1975 | Fed. Rep. of Germany . |
| 2530482 | 1/1976 | Fed. Rep. of Germany . |
| 2740770 | 3/1978 | Fed. Rep. of Germany . |
| 2364581 | 9/1976 | France . |
| 1518822 | 7/1978 | United Kingdom . |
| 2013939 | 8/1979 | United Kingdom . |
| 1571054 | 7/1980 | United Kingdom . |

Primary Examiner—Raymond F. Cardillo, Jr.
Assistant Examiner—Alan K. Aldous
Attorney, Agent, or Firm—Louis Bernat

[57] ABSTRACT

A tracking control system is used for a magnetic recording and/or reproducing apparatus in which a magnetic head relatively scans a magnetic recording medium to record and/or reproduce an information signal thereon and/or therefrom. The tracking control system comprises a circuit for supplying a tracking reference signal to the magnetic head together with the information signal. The reference signal supplying circuit supplies the tracking reference signal to the magnetic head so that the magnetic head is positioned at a position where the recorded position of a tracking reference signal on both sides of the tracks adjacent to a certain track is positioned successively shifted respectively to the track longitudinal direction with respect to the tracking reference signal recorded position at the certain track. The tracking control system further comprises a discriminating circuit for discriminating the relative phase with respect to a normal tracking reference signal of a tracking reference signal reproduced as cross-talk from a track adjacent to the track which is to be scanned, according to the normal tracking reference signal reproduced from a normal track which is to be scanned by the magnetic head, from within the signal reproduced by the reproducing means, a tracking error signal deriving circuit for deriving a tracking error signal from the output signal of the discriminating circuit, and a controlling circuit for controlling the relative scanning phase of the magnetic head with respect to the track of the magnetic recording medium by obtaining the mean value component of the tracking error signal from each plurality of tracks out of the tracking error signals.

5 Claims, 44 Drawing Figures

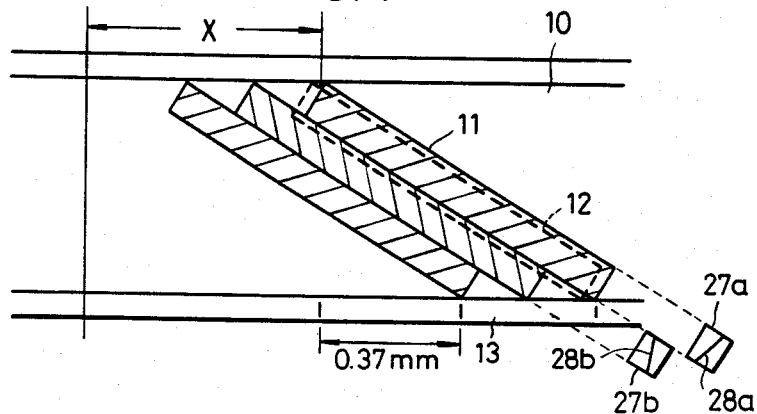
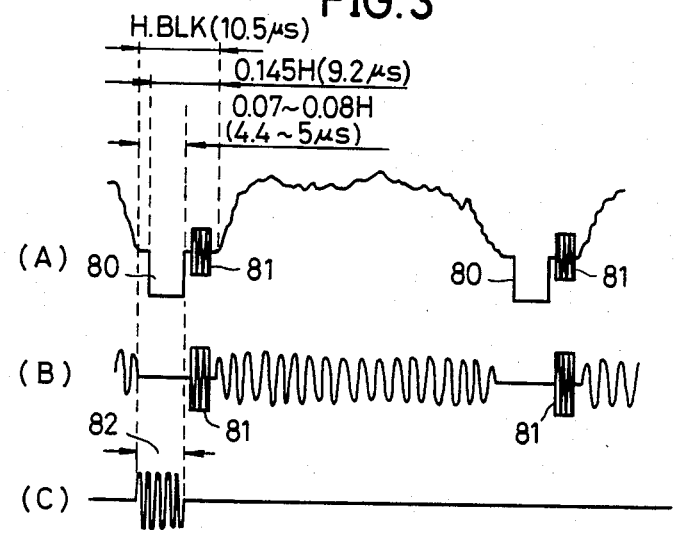
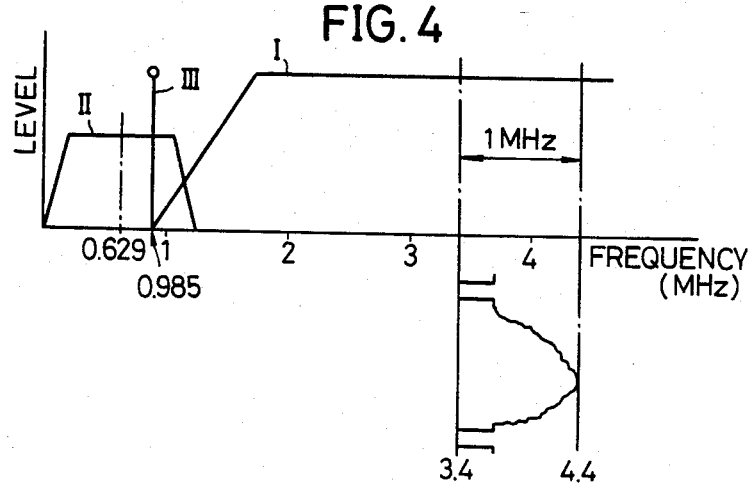

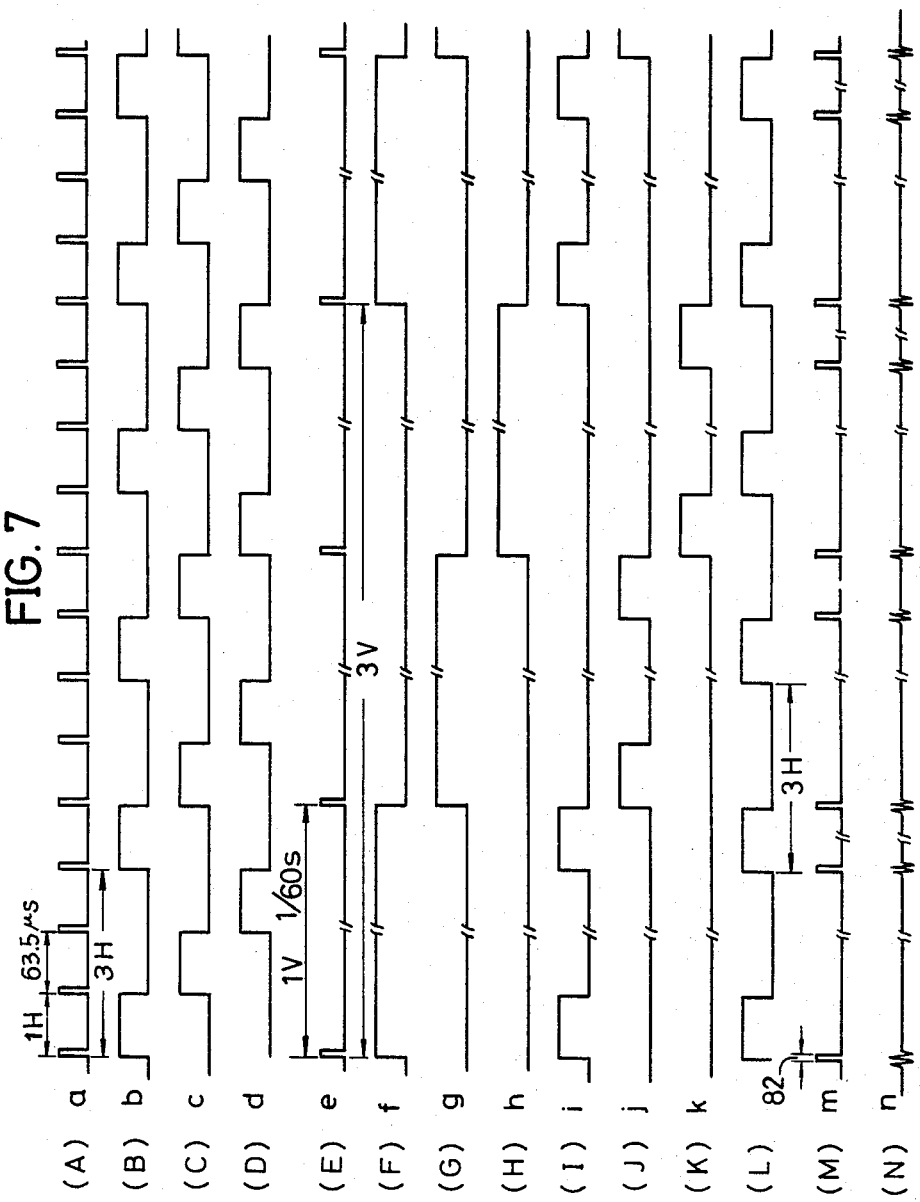

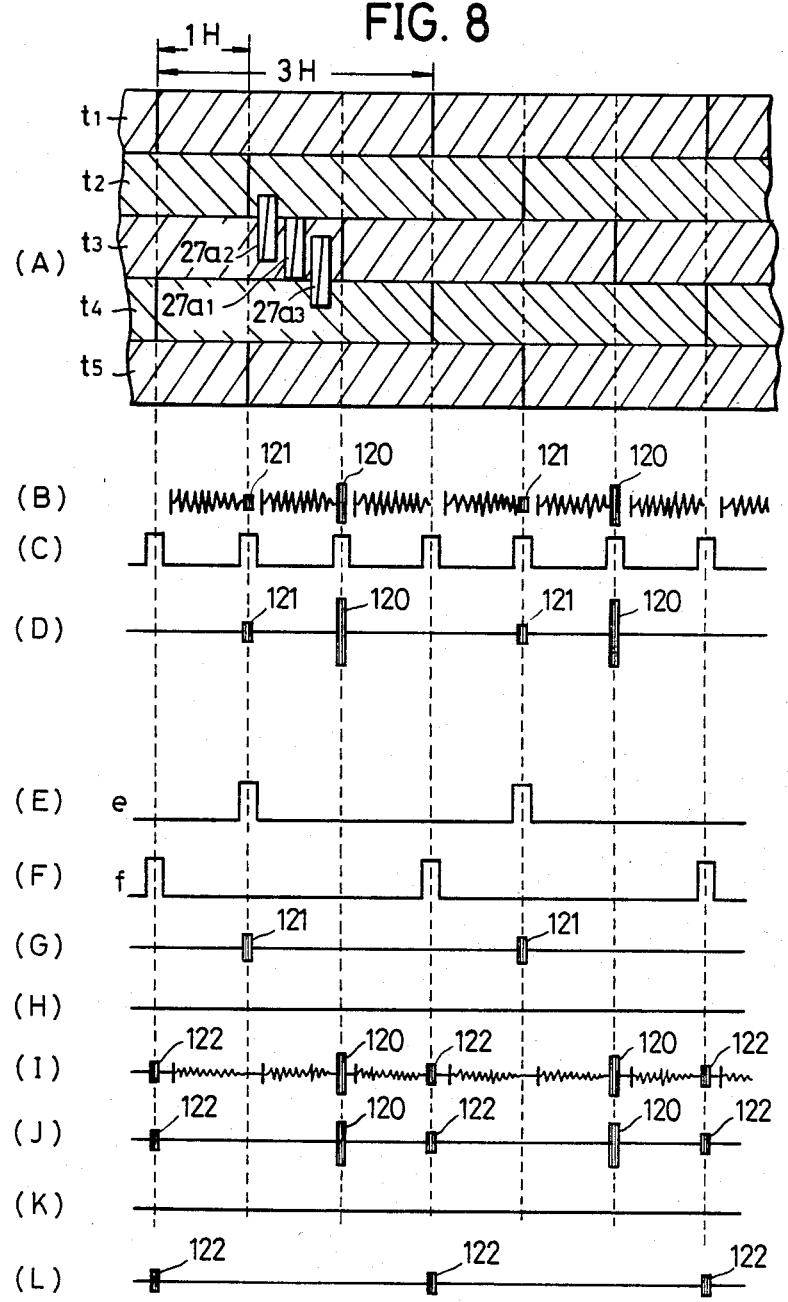

TRACKING CONTROL SYSTEM FOR MAGNETIC VIDEO RECORDING AND/OR REPRODUCING APPARATUS WITH TRACKING SIGNAL POSITIONS STAGGERED WITH RESPECT TO THE POSITIONS OF TRACKING SIGNALS ON ADJACENT TRACKS

This is a Continuation of U.S. application Ser. No. 214,762, filed Dec. 9, 1980 now abandoned, and entitled "TRACKING CONTROL SYSTEM FOR MAGNETIC VIDEO RECORDING AND/OR REPRODUCING APPARATUS IN WHICH TRACKING SIGNAL POSITIONS ARE STAGGERED WITH RESPECT TO THE ADJACENT TRACK".

BACKGROUND OF THE INVENTION

The present invention relates generally to tracking control systems in magnetic recording and/or reproducing apparatuses and more particularly to a system which, by controlling the rotational phase of reproducing rotating magnetic heads, accomplishes tracking control in a manner such that the magnetic heads can trace accurately along a track on a magnetic tape.

In recent years, in magnetic recording and/or reproducing apparatuses such as video tape recorders (VTR) of the helical scan type for home use, there has been a trend toward even higher densities of recording and reproducing, aided by improvements in magnetic tapes. For example, by reducing the tape speed and track pitch to approximately ⅓, for example, of their values as compared to the case of the conventional recording and/or reproducing capacity of 2 hours, recording and reproducing of 6 hours can be carried out. Such long-duration recording and/or reproducing techniques are being reduced to practice. However, in the VTR for home use, in which the tape travel system is simplified in order to lower the cost, it is difficult to reproduce a magnetic tape having a reduced track pitch as mentioned above while positively maintaining the required tracking precision.

Furthermore, in a magnetic recording/reproducing apparatus capable of recording/reproducing for 2 hours, it is necessary to manipulate a tracking knob in order to cause the magnetic head to undergo accurate tracking along a track of the magnetic tape when interchanged reproduction is performed with another apparatus. That is, in the case where there are (1) differences in the position of the control head, (2) differences in the height of the video head, and (3) skews in the video track, between the recording and reproducing apparatuses, optimal tracking state is not obtained, and hence maximum output cannot be obtained at the time of this interchanged reproduction.

For example, in the case where the distance L from the position where a video head which is mounted on the rotary drum begins to make contact with the magnetic tape to the position of the control head is longer than a standard value in the recorder, the tracking phase deviates. In this case, a control pulse is recorded by the control head at the lower edge of the magnetic tape. In a magnetic recording and/or reproducing apparatus capable of carrying out recording and reproducing of 6 hours, for example the recording interval of the control pulse is 0.37 mm., which is approximately ⅓ of the 1.11 mm, obtained in the case of a conventional recording and reproducing of 2 hours.

In the case where the above mentioned distance L is not coincident with the standard value, it is necessary to adjust the tracking knob to delay the reproducing control signal by a required time to thereby carry out normal tracking. However, adjustment of the tracking knob requires an operation in which, as the reproduced picture is observed, the knob is finely adjusted in a manner such that noise is not generated, and this manipulation is complicated.

Furthermore, while the rotational control of the rotary drum and the rotating magnetic heads carried out by means of a drum servo-control by reproducing the above mentioned control pulses accomplishes a control function of a degree such as to maintain the relative positions of the corresponding positional relationship between each track and the rotating video heads, this rotational control, in the prior art, has not accomplished the function of a so-called tracking control.

SUMMARY OF THE INVENTION

Accordingly, it is a general object of the present invention to provide a novel and useful tracking control system in a magnetic recording and/or reproducing apparatus in which the above described problems have been overcome.

Another and more specific object of the present invention is to provide a tracking control system in a magnetic recording and/or reproducing apparatus which comprises recording means for recording a tracking reference signal by forming tracks together with an information signal which is to be recorded, every predetermined horizontal scanning period of the above information signal, as well as recording on a magnetic recording medium so that the tracking reference signal recording position of a certain track is at a position in front with respect to one track in the track longitudinal direction, and at a position at the rear with respect to the other track of the tracking reference signal recording position of each of the two adjacent tracks on both sides of the above certain track, discriminating means for gate-discriminating the relative phase with respect to the tracking reference signal reproduced from the above track which is to be scanned of the above tracking reference signal reproduced as crosstalk from the tracks adjacent to the above track which is to be scanned, by obtaining a gate pulse from the above tracking reference signal reproduced from the track which is to be scanned, of the signal reproduced by a magnetic head from the above magnetic recording medium, a differential amplifier which obtains a tracking error signal from the output signal of the above discriminating means, and control means for controlling the relative scanning phase of the above magnetic head with respect to the magnetic recording medium, by obtaining the average value component of the tracking error signal at each of the plurality of tracks, of the output tracking error signal of the differential amplifier. According to the system of the present invention, the scanning phase of the magnetic head can be controlled upon reproduction without employing head moving mechanism or its control system, and can employ a known servo circuit, which enables a tracking control with low cost and simple construction.

Especially upon interchanged reproduction, the troublesome operation of the tracking knob which was conventionally required is not necessary, and interchanged reproduction of high quality can be obtained positively in a stable manner, by a tracking servo loop of a closed-loop construction. Since the tracking control is performed by use of the average value component of the tracking error every plurality of tracks, the system is especially effective upon normal reproduction. Upon reproduction of a magnetic recording medium having a track pattern in which it comprises no guard band such as in azimuth recording, the system is effective because the cross-talk between the adjacent tracks can be used. Hence, desirable tracking control can be obtained upon reproduction of tracks having narrower track width for long-duration magnetic recording and/or recording of the high density type in use recently.

Another object of the present invention is to provide a tracking control system which comprises a head moving mechanism which displaces the above magnetic head in a direction substantially perpendicular to the longitudinal direction of the track, and a second control means for controlling the magnetic head so that it scans on the track by applying the A.C. component in each track of the above described output tracking error signal of the amplifier. According to the system of the invention, the magnetic head can be made to trace and scan on the track instant by instant even repective to the tracking error component which is a severe problem upon skew of the track, the degree of inclination of the track, and high density recording. Therefore, the tracking control can be performed within a substantially large control range. Furthermore, especially upon the so-called varying speed reproduction, the magnetic head can be made to trace and scan accurately on the track by maintaining a predetermined mean mechanical displacement value of the head moving mechanism, and many kinds of specially reproduced pictures can be obtained having no noise bar. Moreover, upon simultaneous use of a head moving mechanism in which two magnetic heads are displaced by a so-called see-saw operation, the tracking control can be performed quite desirably by the above two systems of closed-loop tracking servo-control construction.

Still another object of the present invention to provide a tracking control system which multiplexes the above tracking reference signal to the information signal with respect to a predetermined period with the horizontal blanking period of the information signal, as well as selecting the frequency of the tracking reference signal to a single frequency. According to the invention, quite accurate and stable tracking error signal can be generated. Furthermore, beat interferences are not introduced as in the case upon successive recording, and a switching pulse for switching over the tracking control polarity upon reproduction is not required as compared to the case where three kinds of tracking reference signals are changed over every track and successively recorded. Hence, the circuit construction of the system is simple and can be realized at low cost.

Still another object of the invention is to provide a tracking control system which selects the above tracking reference signal at a frequency within the frequency band of a low-band frequency converted carrier chrominance signal, and performs the recording by substantially mixing the tracking reference signal with the low-band frequency converted carrier chrominance signal in a time-series manner. According to the invention, occupied recording frequency band is not required for recording the tracking reference signal, and hence, is especially effective when applied to apparatuses in which the frequency band which is possible to record and/or reproduce is of relatively narrow band like the magnetic recording and/or reproducing apparatuses for home use.

Other objects and further features of the present invention will be apparent from the following detailed description with respect to the preferred embodiments of the invention when read in conjunction with the accompanying drawings.

BRIEF DESCRIPTION OF THE DRAWINGS

FIG. 1 is a diagram showing track patterns on a magnetic tape;

FIGS. 3(A) through 3(C) are graphs respectively showing waveforms at each parts of the block diagram of FIG. 2;

FIG. 4 is a graph showing one example of the frequency spectrum of a recording signal;

FIGS. 7(A) through 7(N) are graphs respectively showing the waveforms of signals at each parts of the systematic block diagram of FIG. 7;

FIG. 8(A) is a diagram for describing the state of the tracking upon reproduction;

FIGS. 8(B) through 8(L) are graphs respectively showing the waveforms of signals at each parts of the essential part of the reproducing system in the systematic block diagram of FIG. 2;

DETAILED DESCRIPTION OF THE INVENTION

Figure 2:
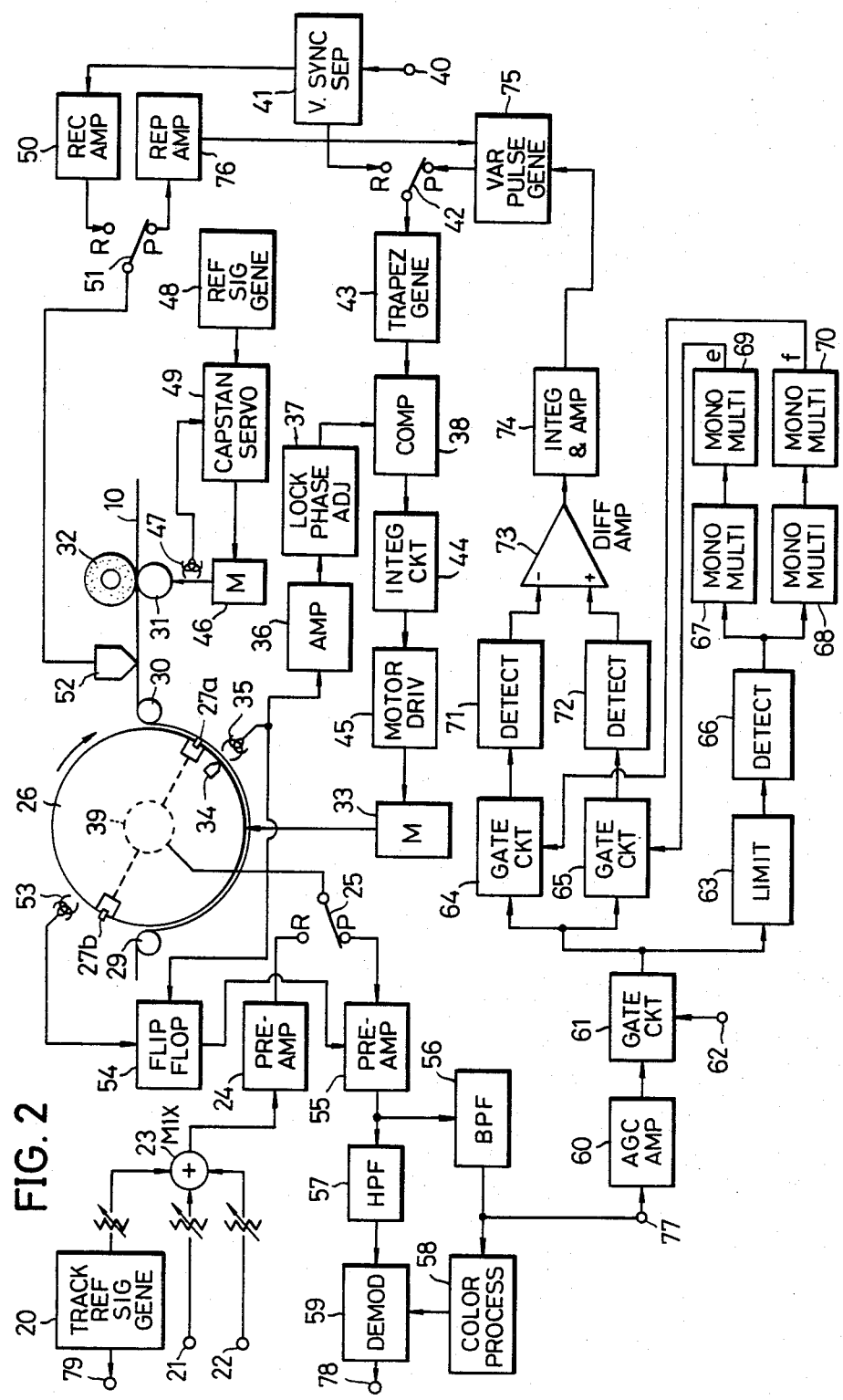
FIG. 2 is a systematic block diagram showing a first embodiment of a tracking control system of the present invention.

For example, in the case where the distance X from the position where a video head mounted on the rotary drum begins to make contact with the magnetic tape 10, to the control head, as indicated in FIG. 1 is longer than a standard value in the recorder, the scanning path of the reproducing video head becomes as indicated by a dotted lines 12 and deviates from the track indicated by a solid line 11. Control pulses are recorded by the control head along a track 13 at the lower edge of the tape, and, in the case of a long-time recording, as described hereinbefore, the recorded interval of the control pulse is very small, 0.37 mm, for example, which is approximately ⅓ of the conventional value. For this reason, the absence of tracking phase deviation is especially required.

A first embodiment of the tracking control system according to the present invention will now be described in conjunction with FIG. 2. A tracking reference signal generator 20 generates a tracking reference signal of a single frequency at a constant duration every predetermined period as described hereinafter. A luminance signal separated from a standard color television video signal of a system such as the NTSC system, for example, frequency modulates a carrier wave such that the white peak corresponds to at 4.4 MHz and the tip of the synchronizing signal corresponds to 3.4 MHz. Thus obtained frequency modulated (FM) luminance signal is supplied to an input terminal 21. A carrier chrominance signal of a color sub-carrier frequency of 3.58 MHz separated from the above mentioned standard color video signal is frequency converted to low frequency band. Thus obtained low-band frequency converted carrier chrominance signal of a chrominance sub-carrier frequency of approximately 629 KHz (a frequency which is 40 times the horizontal scanning frequency fh of the video signal) is applied to an input terminal 22. The above mentioned tracking reference signal produced as output from the tracking reference signal generator 20 is mixed in a mixer 23 together with the above described FM luminance signal applied through the input terminal 21, and the above described low-band frequency converted carrier chrominance signal applied through the input terminal 22.

Here, the above mentioned tracking reference signal is a single frequency signal, which is produced as output as indicated in FIG. 3(C) during a time interval corresponding to the interval in which the front porch and a horizontal synchronizing signal 80 exist in the color video signal indicated in FIG. 3(A) excluding the back porch period in which a color burst signal 81 within the horizontal blanking period (H.BLK) thereof exists. Furthermore, this tracking reference signal is produced from the tracking reference signal generator 20 at every predetermined period (e.g., every interval 3H) so that the recorded position of the tracking reference signal on one of the recorded tracks will be different in the front and at the rear, respectively, in the longitudinal direction of the track relative to the recorded positions of the tracking reference signals on the two tracks which are adjacent to that one track. FIG. 3(B) indicates the waveforms of the carrier chrominance signal and the color burst signal, which are separated from the color video signal indicated in FIG. 3(A).

Furthermore, the frequency of the above described tracking reference signal is selected at the frequency band of the low-frequency converted carrier chrominance signal, for example, at 895 KHz, which is ¼ the value of the chrominance sub-carrier frequency, mainly 3.58 MHz.

Thus, even when the frequency of the tracking reference signal is caused to co-exist in the frequency band of the low-band frequency converted carrier chrominance signal, the tracking reference signal is inserted within the interval comprising no signals (the interval designated by reference numeral 82 in FIG. 3(B)) of the low-band frequency converted carrier chrominance signal, and those signals are mutually time divisionally multiplexed, whereby the those signals are respectively discriminated and separated by sampling gate means.

The tracking reference signal may be multiplexed and recorded over the entire horizontal blanking period H.BLK of the color video signal. Even in this case, the frequency of the tracking reference signal differs from the frequency of the chrominance sub-carrier wave of the low-band frequency converted carrier chrominance signal, that is, the frequency of the color burst signal (for example, of approximately 629 KHz). Accordingly, the color burst signal and the tracking reference signal can be effectively separated by using sampling gate means and frequency selection means together.

The frequency spectrum of the mixed signal produced as output from the mixer 23 becomes as indicated in FIG. 4, in which the FM luminance signal is indicated by the band I, the low-band frequency converted carrier chrominance signal by the band II, and the tracking reference signal by the band III. The above mentioned mixed signal is appropriately amplified by a preamplifier 24 and thereafter, passing through a changeover switch 25 which is connected on the side of its contact point R at the time of recording, and through a rotary transformer 39, is supplied respectively to two magnetic heads 27a and 27b provided on a rotary drum 26 on diametrically opposite sides thereof.

As shown in FIG. 1, gaps 28a and 28b of the magnetic heads 27a and 27b are inclined in opposite directions with a predetermined angle, that is, the magnetic heads 27a and 27b have opposite azimuths. The magnetic tape 10, guided by a guide pole 29, is wrapped around the cylindrical surface of the rotary drum 26 over a specific angular range, and, further guided by a guide pole 30, and clamped between a capstan 31 and a pinch roller 32, thereby being driven in its travelling direction. The magnetic heads 27a and 27b alternately form on the magnetic tape 10 in succession, one video track inclined relative to the longitudinal direction of the magnetic tape per each field without providing any guard bands.

The rotary drum 26 is rotated at a speed of, for example, 1,800 rpm, by a drum motor 33, and its rotational phase and speed are controlled at constant values by a drum servo-control system described below. The rotary drum 26 is provided with a magnet 34, which unitarily rotates with the rotary drum 26. Every time this magnet 34 passes in front of a pickup head 35, this pickup head 35 produces as output, a drum pulse, which is supplied by way of a pulse amplifier 36 and a lock phase adjusting circuit 37, to a comparator 38.

On the other hand, a standard color video signal to be recorded, which has been introduced through an input terminal 40, is fed to a vertical synchronizing signal separation circuit 41, wherein the vertical synchronizing signal is separated. This vertical synchronizing signal thus separated, is passed through a changeover switch 42 closed on the side of its contact point R at the time of recording, and is supplied to a trapezoidal wave generating circuit 43, where it is converted into a trapezoidal wave of 30 Hz. Thereafter, this trapezoidal wave is supplied to the comparator 38 to undergo phase comparison with the above mentioned drum pulse. An error voltage in accordance with the phase difference is thus obtained from the comparator 38, and is passed through an integration circuit 44 for cutting a frequency component of ½ or more of the sampling frequency of 30 Hz, at the same time attenuating the hunting, and, moreover, taking an amply large gain of the very low frequency part thereby to reduce the constant deviation, in order to accomplish smooth control of the drum rotational phase. The resulting output of the integration circuit 44 is supplied to a motor driving circuit 45, where is converted into a required control voltage, and is applied to the drum motor 33 to control the rotational phase of the rotary drum 26.

The capstan 31 is rotated by a capstan motor 46. As is known, its rotation is picked up by a capstan pickup head 47, the output of which is fed to a capstan servo circuit 49, where its phase is compared with that of a standard signal from a standard signal generator 48. As a result, the capstan servo circuit 49 produces as output a signal for causing the capstan motor 46 to rotate continuously with predetermined constant phase and speed, and this output signal is applied to the capstan motor 46. At the time of recording, the vertical synchronizing signal from the vertical synchronizing signal separation circuit 41 is amplified by a recording amplifier 50 and then, is passed through a changeover switch 51 closed on the side of its contact point R, and thus supplied to a control head 52 to be recorded as control pulses along an edge part of the magnetic tape 10 in the longitudinal direction thereof.

Figure 5:
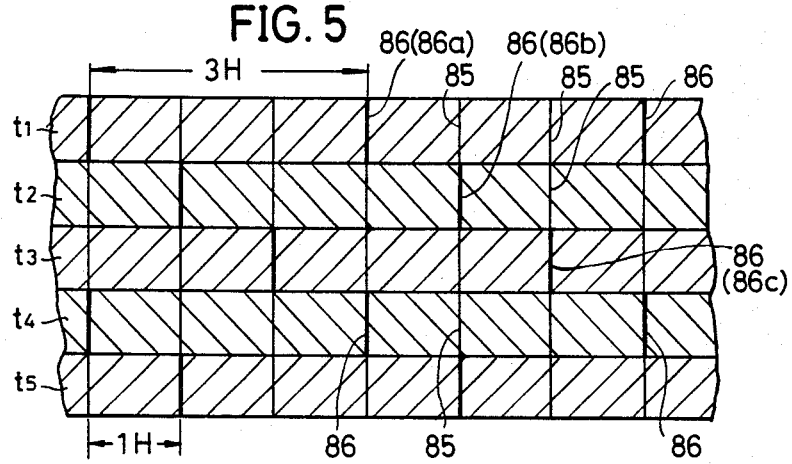
FIG. 5 is a diagram showing one example of the track pattern on the magnetic tape formed by a magnetic recording and/or reproducing apparatus applied with a system of the present invention.

One example of a track pattern formed in this manner on the magnetic tape 10 becomes as shown in FIG. 5, which is a partly enlarged view. In FIG. 5, tracks $t_1$, $t_2$, $t_3$, $t_4$, and $t_5$ are respectively formed with inclination relative to the longitudinal direction of the tape. Tracks $t_1$, $t_3$, $t_5$, . . . are recorded and formed, for example, by the aforementioned rotating magnetic head 27a, while tracks $t_2$, $t_4$, $t_6$, . . . are recorded and formed by the aforementioned rotating magnetic head 27b. The horizontal synchronizing signals are recorded at positions indicated by thin lines 85 on respective tracks. The positions of the lines 85 are aligned in lines on the adjacent tracks in directions perpendicular to the longitudinal direction of the tracks. The tracking reference signals are recorded at positions indicated by thick lines 86. The interval of the positions of the lines 86 is 3H (H indicates a horizontal scanning period). The positions of the lines 86 are staggered on respective adjacent tracks. For example, the tracking reference signal recording positions 86a, 86b and 86c on the tracks $t_1$, $t_2$, and $t_3$ are sequentially staggered by 1H interval.

Figure 6:
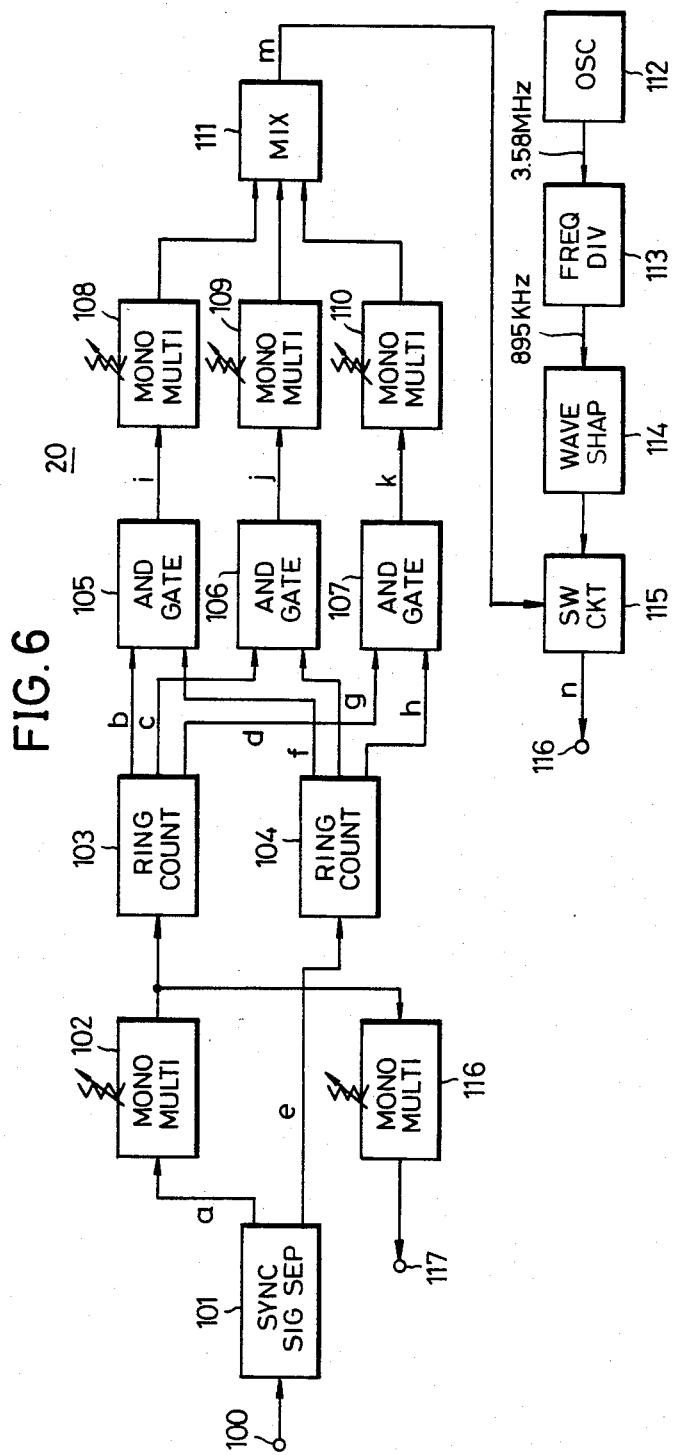
FIG. 6 is a detailed systematic block diagram showing one embodiment of essential parts of the block diagram of FIG. 2.

An embodiment of the tracking reference signal generator shown in FIG. 2 is described in detail with reference to FIG. 6. In FIG. 6, a recording standard color television video signal applied to an input terminal 100 is supplied to a synchronizing signal separation circuit 101 where vertical synchronizing signal and horizontal synchronizing signal are separated from the video signal. The horizontal synchronizing signal a shown in FIG. 7(A) which is derived from the synchronizing signal separation circuit 101 is supplied to a monostable multivibrator 102 which generates a pulse which coincides with the rising of the horizontal synchronizing signal a and is delayed by approximately 1H. This pulse in supplied to a ring counter 103 which generates pulses b, c, and d shown in FIGS. 7(B), 7(C), and 7(D) which have respectively a pulse width of 1H and an interval of 3H. The pulses b, c, and d are sequentially derived with 1H time difference with each other.

The vertical synchronizing signal e shown in FIG. 7(E) which is derived from the synchronizing separation circuit 101 is supplied to a ring counter 104 which generates pulses f, g, and h respectively having pulse width of 1V (V designates a vertical scanning period) and time interval of 3V as shown in FIGS. 7(F), 7(G), and 7(H). The pulses f, g, and h are sequentially derived with 1H time difference with each other. Shift registers may be used instead of the ring counters 103 and 104. The pulses b and f are supplied to the AND gate 105.

The pulses c and g are supplied to the AND gate 106. The pulses d and h are supplied to the AND gate 107. As a result, pulses i, j, and k shown in FIGS. 7(I), 7(J), and 7(K) are respectively derived from the AND gates 105, 106, and 107. The pulses i, j, and k respectively have pulse width of 1H and are derived during 1V period. This deriving 1V period has 3V time interval. Further, as clearly shown in FIGS. 7(I), 7(J), and 7(K), during a certain 1V period, only the pulses i are derived, while the pulses j and k are not derived. During a next 1V period, only the pulses j are derived. And during further next 1V period, only the pulses k are derived. In time sequential the pulses i, j, and k show a series of pulses each of which has a pulse width of 1H and a time interval of 3H.

The above pulses i, j, and k are respectively applied to monostable multivibrators 108, 109, and 110, wherein the pulses are transformed into pulses having pulse width of high level, for the predetermined period 82 shown in FIG. 3(C) from the rise of the pulses. The pulses obtained from the monostable multivibrators 108, 109, and 110 are respectively supplied to a mixer 111 wherein the pulses are mixed, and a pulse m having a period 3H and a pulse width which is equal to the period 82 corresponding to the period excluding the back porch within the horizontal blanking period as shown in FIG. 7(M), is obtained. This pulse m thus obtained is applied to a switching circuit 115 as a switching pulse.

On the other hand, an oscillating output (sinusoidal wave) of high frequency stability of about 3.58 MHz is obtained from an oscillator 112, and this oscillating output is frequency divided to one-fourth its frequency, to about 895 KHz, by a frequency divider 113. The frequency divided output is supplied to the switching circuit 115 through a wave shaping circuit 114, and the signal is supplied to an output terminal 116 from the switching circuit 115 only during the period in which the switching pulse from the above mixer 111 is applied thereto. Accordingly, a sinusoidal wave n of about 895 KHz is obtained every period 3H from the switching circuit 115, for the period 82 which corresponds to the period excluding the back porch within the horizontal blanking period of the standard color video signal which is to be recorded, as shown in FIG. 7(N) or FIG. 3(C). This signal thus obtained is supplied to the mixer 23 as a tracking reference signal from the output terminal 116 as shown in FIG. 2. The tracking reference signal of single frequency (about 895 KHz in this case) thus generated, is recorded at the position 86 shown by the line of FIG. 5 by the magnetic heads 27a and 27b, as described above.

Referring back to the block diagram of FIG. 2, the operation of the system of the present invention upon reproduction will now be described. During reproduction, the changeover switches 25, 42, and 51 are respectively connected to the side of the contact point P. The signal alternately reproduced by the magnetic heads 27a and 27b from the magnetic tape 10 which is moving at a speed identical to that upon recording, is supplied to a preamplifier 55 through a rotary transformer 39 and the changeover switch 25, respectively. The connection at the preamplifier 55 is changed over and connected according to the output signal supplied from a flip-flop 54, and the signal supplied to the preamplifier as described above is transformed into a continuous signal. The flip-flop 54 is triggered by the pulses supplied from the pick-up heads 35 and 53 (these pick-up heads are provided mutually opposing each other) each of which produces a pulse as output every time the magnet 34 passes in front of it. As a result, the flip-flop 54 generates a symmetrical rectangular wave of 30 Hz.

The reproduced signal obtained from the preamplifier 55 is a composite signal comprising an FM luminance signal, a low-frequency transformed carrier chrominance signal, and a tracking reference signal which co-exists within the frequency band of the low-band frequency converted carrier chrominance signal, and this signal is respectively supplied to a band-pass filter 56 and a high-pass filter 57. The above low-frequency transformed carrier chrominance signal separated at the band-pass filter 56 by the above reproduced composite signal, is supplied to a color processing circuit 58. The reproduced low-band frequency converted carrier chrominance signal thus supplied to the band-pass filter 56 is converted back into a carrier chrominance signal of the original frequency band, having a chrominance sub-carrier frequency of 3.58 MHz, and at the same time, supplied to a demodulating circuit 59 after being eliminated of its time-axis fluctuation component. The demodulating circuit 59 frequency demodulates the reproduced FM luminance signal separated from the above reproduced composite signal by the high-pass filter 57, to a luminance signal in the original frequency band, and also obtains a reproduced color video signal by multiplexing the demodulated luminance signal with the reproduced carrier chrominance signal from the color processing circuit 58. This reproduced color video signal is obtained from an output terminal 78.

On the other hand, the reproduced low-band frequency converted carrier chrominance signal as well as the reproduced tracking reference signal which coexists within the frequency band of the reproduced low-band frequency converted carrier chrominance signal, within the above reproduced composite signal obtained from the band-pass filter 56, are supplied to a gate circuit 61 through the input terminal 77 and an AGC amplifier 60. The signal thus supplied to the gating circuit 61 is gated by the gating pulse supplied from a terminal 62. The gating pulse applied to the terminal 62 is supplied through an output terminal 117 from the multivibrator 116 which is triggered by a pulse in synchronism with the horizontal synchronizing signal obtained from the multivibrator 102 of the tracking reference signal generator 20 shown in FIG. 6. This gating pulse is a pulse of the form shown in FIG. 8(C), which is of high level during the period which corresponds to the period excluding the back porch within the horizontal blanking period of the horizontal synchronizing signal within the reproduced chrominance signal, and sets the gate circuit 61 in a signal passing state during the period in which the pulse is of high level.

Accordingly, a reproduced tracking reference signal existing within the frequency band of the reproduced low-band frequency converted carrier chrominance signal, is separated and obtained from the reproduced low-frequency transformed carrier chrominance signal of the gate circuit 61. This reproduced tracking reference signal (including the tracking reference signal reproduced as cross-talk from the adjacent tracks when tracking deviation exists) is respectively supplied to a limiter 63, and gate circuits 64 and 65. The AGC amplifier 60 and the limiter 63 can be omitted. The reproduced tracking reference signal obtained from the limiter 63 is supplied to a detection circuit 66, wherein the reproduced tracking reference signal having a level higher than that of a predetermined level is detected.

That is, the detection circuit 66 detects only the tracking reference signal reproduced from the track which is scanned by the rotating magnetic heads 27a and 27b. This detected output is applied respectively to multivibrators 67 and 68, and triggers these multivibrators. These multivibrators 67 and 68 are used for position adjustment, and are triggered at the leading edge of the output of the wave detection circuit 66. Accordingly, these multivibrators 67 and 68 supply as output a pulse of a predetermined pulse width, and triggers width adjusting multivibrators 69 and 70 at the trailing edge of the above output pulse. Therefore, a gating pulse which becomes of high level during the period which corresponds to the period excluding the back porch within the horizontal blanking period of the horizontal synchronizing signal, that is, approximately a period of 2H later than the tracking reference signal reproduced from the scanned track as shown in FIG. 8(E), is supplied to the gate circuit 64 from the multivibrator 69. On the other hand, a gating pulse f which becomes of high level during the period which corresponds to the period excluding the back porch within the horizontal blanking period of the horizontal synchronizing signal, that is, approximately a period of 1H later than the tracking reference signal reproduced from the scanned track as shown in FIG. 8(F), is supplied to the gate circuit 65 from the multivibrator 70.

When the magnetic heads 27a and 27b are accurately scanning the track which is recorded by a magnetic head having the same azimuth angle as those of the magnetic heads 27a and 27b (when the rotating head 27a is accurately scanning a track t3 as shown by 27a1 of FIG. 8(A)), no signal is supplied as output from the gate circuits 64 and 65.

Hence, in a mistracking state in which reproduction and scanning is performed extending over tracks t2 and t3 as shown by 27a2 of FIG. 8(A) upon scanning of the track t3 by the rotating head 27a, the input signal waveform of the gate circuit 61 becomes of a signal waveform shown in FIG. 8(B), which comprises the reproduced low-band frequency converted carrier chrominance signal, color burst signal, a reproduced tracking reference signal 120 obtained from the track t3, and a tracking signal 121 which is of low level obtained from the track t2 as cross-talk a period of 2H later than that of the reproduced tracking reference signal 120. Here, in the above mentioned known azimuth recording system, the track t2 (or t4) adjacent to the track t3 is a track recorded by the rotating magnetic head 27b having an azimuth angle different from that of the rotating magnetic head 27a. Therefore, the signal of high frequency in the adjacent track t2 is hardly reproduced due to the so-called azimuth loss, however, the recorded tracking reference signal of low frequency is reproduced in a somewhat degraded state.

Accordingly, the output signal waveform of the gate circuit 61 becomes of a form shown in FIG. 8(D), and the output signal waveforms of the gate circuits 64 and 65 constructed so that they provide the input signal as gate outputs, become of the form shown in FIGS. 8(G) and 8(H) during the period in which the gating pulses e and f are of positive polarity. Moreover, the tracking reference signal 121 reproduced as cross-talk from the adjacent track t2 only by the gate circuit 64, is supplied to a differential amplifier 73 through a detection circuit 71.

On the other hand, in a mistracking state in which the rotating magnetic head 27a reproduces and scans extending over the tracks t3 and t4 as shown by 27a3 of FIG. 8(A), the reproduced tracking reference signal 120 from the track t3 and a tracking reference signal 122 having a low level which is reproduced from the track t4 as cross-talk a period of 1H after the reproduced tracking reference signal 120, which are respectively mixed in a time-series manner to the reproduced low-frequency transformed carrier chrominance signal and the color burst signal, are applied to the gate circuit 61 as shown in FIG. 8(I).

Hence, the output signal waveform of the gate circuit 61 becomes of a form shown in FIG. 8(J), and the output signal waveforms of the gate circuits 64 and 65 accordingly becomes of the form shown in FIGS. 8(K) and 8(L). The tracking reference signal 122 reproduced as cross-talk from the track t4 is shown in FIG. 8(L), which is obtained only from the gate circuit 65, is supplied to the differential amplifier 73 through a detection circuit 72.

Thus, during normal tracking state, no output is supplied from either the gate circuit 64 or 65, and according to whether the direction of shift upon mistracking is in the leading direction of the phase or the lagging direction of the phase, the gate output is constantly obtained with a predetermined relationship from either the gate circuit 64 or 65. Accordingly, the mistracking direction can be discriminated by detecting which of the gate circuit 64 or 65 supplies the gate output. Furthermore, the level of this gate output signal corresponds to the diviation quantity, and by converting the output signal of the gate circuit 64 or 65 into a DC signal by the use of the detection circuits 71 and 72, the deviation quantity in the mistracking can be detected.

The tracking error signal obtained from the differential amplifier 73 differs in polarity according to the mistracking direction, and is a signal having a level corresponding to the above shift quantity. This error signal is supplied to an integrating and amplifying circuit 74, and supplied to a variable pulse generating circuit 75 to vary its time constant value, after being averaged and amplified therein. This time constant is related to the response characteristic of the tracking servo loop having a closed loop construction, and desirable result is obtained when the value is approximately 3 to 20 seconds.

Figure 9:
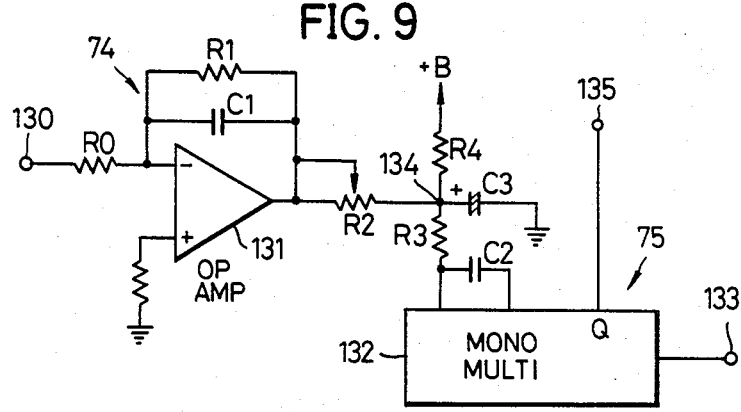
FIG. 9 is a concrete circuit diagram showing a part of the systematic block diagram of FIG. 2.
Figure 10:
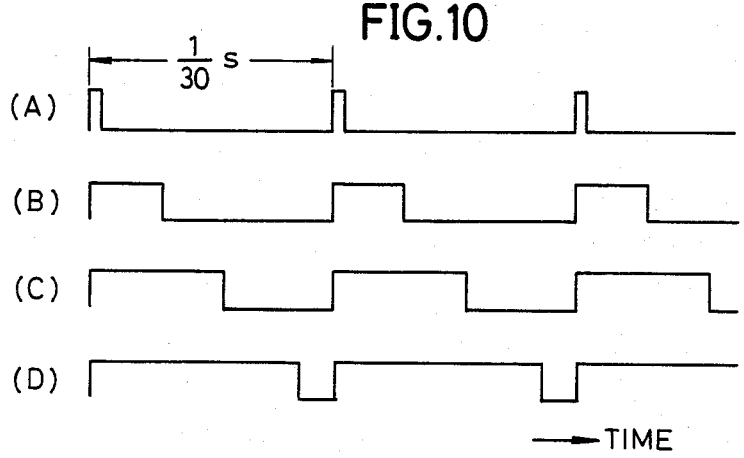
FIGS. 10(A) through 10(D) are graphs respectively showing the signal waveforms at each part of the circuit of FIG. 9.

In FIG. 9, the integrating and amplifying circuit 74 comprises an operational amplifier 131, a parallel circuit provided at the feedback circuit having a capacitor C1 and a resistor R1, and a resistor R0 connected between an input terminal 130 and the inverting input terminal of the operational amplifier 131. A variable pulse generating circuit 75 is constructed of a monostable multivibrator 132 and resistors R3 and R4 and capacitors C2 and C3 which determine its time constant. Furthermore, a variable resistor R2 is connected between the output terminal of the operational amplifier 131 and the connection point of the resistors R3 and R4 and the capacitor C3. The time constant is varied according to the voltage at the connection point of the resistors R3 and R4 and the capacitor C3. A control pulse (shown in FIG. 10(A)) reproduced by the control head 52 of FIG. 2 and amplified by a reproducing amplifier 76, is applied as a trigger pulse to the multivibrator 132 from a terminal 133. The multivibrator 132 triggers at the rise of the reproduced control pulse, and produces as output a pulse having a pulse width corresponding to the output voltage of the operational amplifier 131 (corresponding to the voltage at the connection point of the resistors R3 and R4 and the capacitor C3). In FIG. 9, a tracking error signal from the differential amplifier 73 is applied to the input terminal 130, and is integrated and amplified in a circuit which includes the operational amplifier 131. The tracking error signal thus integrated and amplified is applied to a connection point 134 of the resistors R3 and R4 and the capacitor C3 through the variable resistor R2, and varies the voltage at the connection point 134. A predetermined and constant DC power source voltage +B is applied to this connection point 134 through the resistor R4, and thus the voltage at the connection point 134 varies according to the output DC voltage of the operational amplifier 131, that is, the DC voltage of the tracking error signal. Therefore, the output signal of the multivibrator 132 varies as shown in FIGS. 10(B) through 10(D).

The output signal of the multivibrator 132, that is, the output pulse of the variable pulse generation circuit 75 is applied to the trapezoidal wave generator 43 shown in FIG. 2 through the changeover switch 42 which is connected to the side of the contact P side, and the output pulse applied to this trapezoidal wave generator 43 is frequency divided to one-half its frequency and converted into a trapezoidal wave. The output trapezoidal wave undergoes phase comparison with the drum pulse supplied from the lock phase adjusting circuit 37, at the comparator 38. From then on, the rotational phase of the drum motor 33, that is, the rotational phase of the rotating magnetic heads 27a and 27b are controlled by the same drum servo-control system used upon recording, and accurate tracking control is obtained in which the rotating magnetic heads 27a and 27b scan accurately on the video track.

Hence, according to the present invention, tracking control based on the average value of the tracking error signal, can be accurately and stably performed. The troublesome operation of the tracking knob which was required especially upon interchanged reproduction in the conventional apparatus is therefore not required, and reproduced picture of high quality can be obtained even upon interchanged reproduction by the above closed-loop tracking servo which controls the phase of the scanning track relative to the control pulse recording position.

Figure 11:
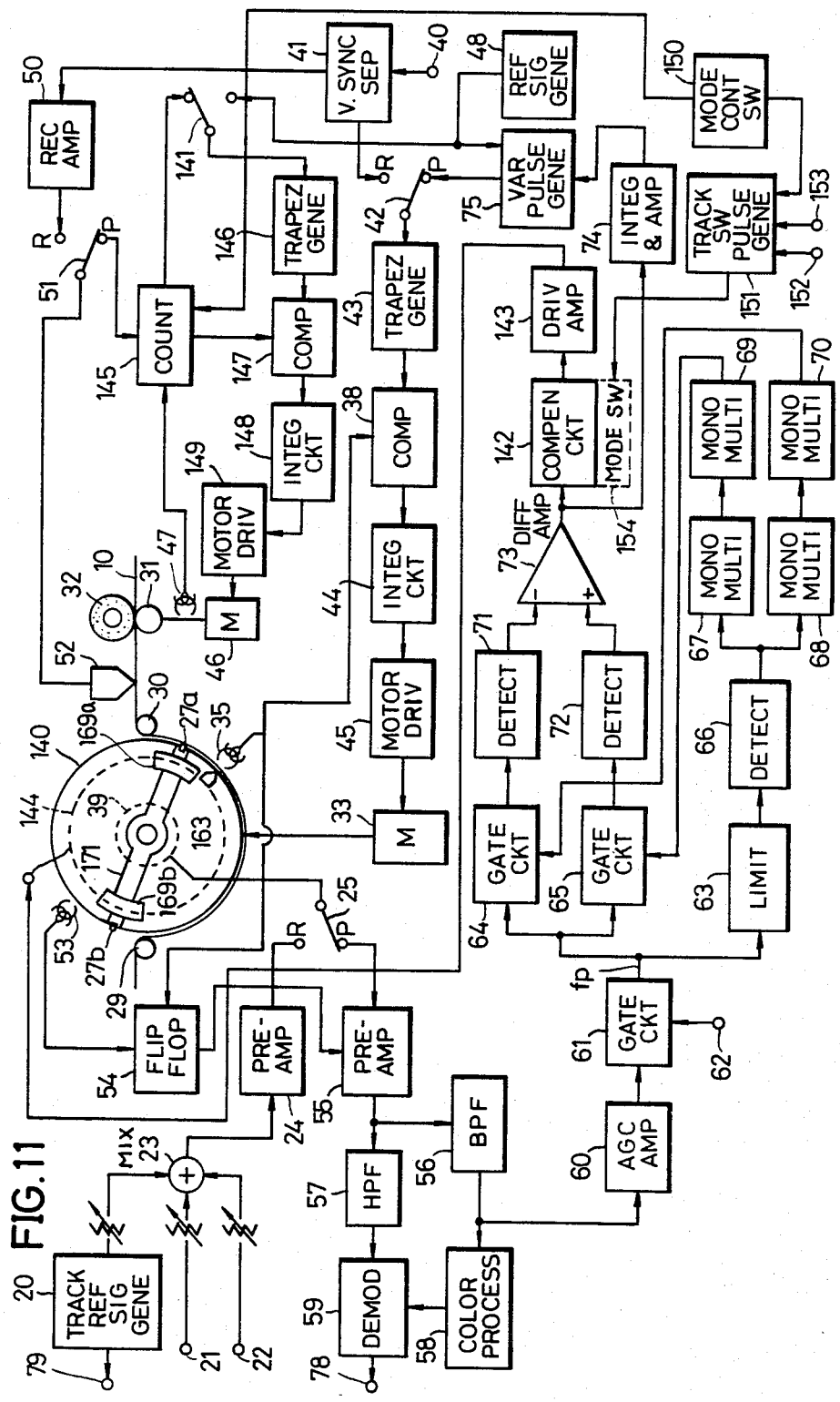
FIG. 11 is a systematic block diagram showing a second embodiment of a tracking control system of the present invention.

A second embodiment of a system according to the present invention will now be described in conjunction with FIG. 11. In FIG. 11, those parts which are the same as those corresponding parts in FIG. 2 are designated by the like reference numerals, and their description will be omitted. In the present embodiment, tracking control of the rotating head is performed for each of the track in the recorded video track, by adding a head moving mechanism to the above first embodiment. Accordingly, fine tracking control can be performed to compensate for skews of the recorded video track, error due to the up-and-down movement of the magnetic tape, the degree of inclination in the video track, and the like, by the tracking servo loop of closed-loop construction. Furthermore, upon reproduction modes in which reproduction is performed under different tape travelling speed as compared to that upon recording, such as during slow-motion reproduction, fast-motion reproduction, and the like, accurate tracking control is performed over the video track and the noise bar is eliminated.

In FIG. 11, a rotatory drum 140 comprises a head moving mechanism which displaces and drives the rotating magnetic heads 27a and 27b in a perpendicular direction relative to the track scanning direction. A known head moving mechanism such as the bending type bimetal can be used as the above had moving mechanism, but here, a case where a head moving mechanism which performs a so-called see-saw operation is employed, will be described, as shown in FIGS. 14(A), 14(B), and 15.

Upon recording, the changeover switches 25, 42 and 51, and a switch 141 are connected on the side of the contact point R. Accordingly, by the same operation as that in the above first embodiment, a track pattern shown in FIG. 5 is formed on the magnetic tape 10.

On the other hand, upon reproduction, the changeover switches 25, 42, 51, and 141 are respectively connected on the side of contact point P. In a normal reproduction mode in which reproduction is performed under the same tape travelling speed as that upon recording, the tracking error signal obtained from the differential amplifier 73 is applied to the variable pulse generation circuit 75 after being obtained of its average error signal component at each plurality of tracks by the integrating and amplifier 74. This signal component is also supplied to a compensation circuit 142 comprising known ratio compensation circuit, differentiation compensation circuit, and the like, and a predetermined characteristic compensation is performed in this compensation circuit 142. The output pulse of the variable pulse generation circuit 75 is supplied to the trapezoidal wave generation circuit 43 through changeover switch 42, as described in the above first embodiment.

The instantaneous value component (AC error signal component) at each track is obtained from the above tracking error signal by the compensation circuit 142. The signal thus obtained is applied to a driving coil 144 of the head moving mechanism after being converted into a desired driving voltage by a driving amplifier 143. Thus, the rotating heads 27a and 27b are controlled so that they scan a predetermined track, by displacing the rotating heads 27a and 27b by small amounts instant by instant in a perpendicular direction to the track longitudinal direction.

Figure 12A:
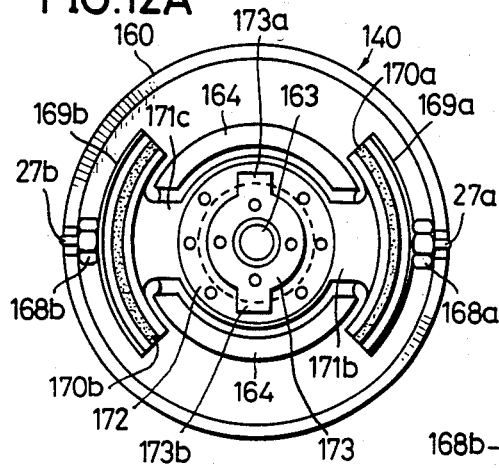
FIGS. 12A, 12B, and 12C are, bottom view of a rotary drum, cross sectional view of a drum assembly, and perspective bottom view of a swinging member, respectively, of one example of a head moving mechanism used in the system of the embodiment shown in FIG. 11.
Figure 12B:
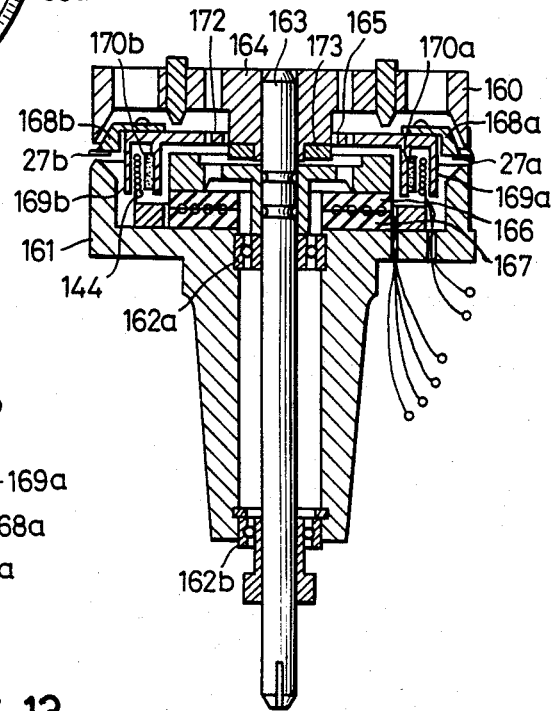
Figure 12C:
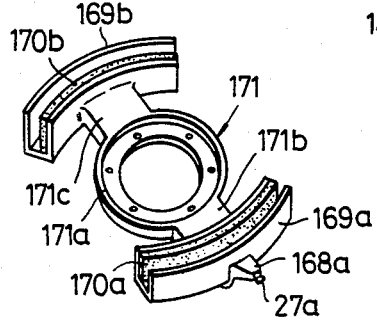

In the present embodiment, a head moving mechanism of the construction shown in FIGS. 12A, 12B, and 12C is used.

A rotary upper drum 160 is fixed at the tip end of a rotary shaft 163 which is rotatably supported by bearings 162a and 162b which are provided extending through the central part of a fixed lower drum 161. The rotary upper drum 160 is rotated, for example, at a predetermined rotational speed of 1800 rpm, due to the rotation of the rotary shaft 163 by the rotation of the drum motor 33.

A projected part of a bushing 164 is integrally fixed to the central part of the rotary upper drum 160, as shown in FIG. 12B. Furthermore, the rotary shaft 163 extends coaxially at the central part of the bushing 164. A fly-wheel 165 is unitarily rotated with the rotary shaft 163, and fixed to a rotary coil mounting part 166 of the rotary transformer. Accordingly, a minute space is formed between the fly-wheel 165 and a fixed coil mounting part 167 of the rotary transformer mounted to the fixed lower drum 161.

The rotating magnetic heads 27a and 27b are respectively linked to arcuate yokes 169a and 169b made of ferromagnetic material respectively through head brackets 168a and 168b made of nonmagnetic material, in positions opposing the yokes 169a and 169b in a 180 degree angle. The cross-section of the yokes 169a and 169b are U-shaped, and respectively having permanent magnets 170a and 170b mounted there within. The yokes 169a and 169b are constructed so that deteriorated effects are not introduced to the magnetic heads 27a and 27b, due to the magnetic flux of the permanent magnets 170a and 170b. Moreover, the yokes 169a and 169b are linked by ferromagnetic plates 171b and 171c which unitarily comprise an opening 171a at their central part, and constructs a swinging member 171 of the form shown in FIG. 12C. The opening 171a of the swinging member 171 is rotatably mounted on the rotary shaft 163 together with a central hole of a support member 172, and also linked and fixed unitarily with respect to the bushing 164 through the support member 172. Furthermore, the swinging member 171 rotates making a so-called see-saw movement in the up-and-down direction of FIG. 12B or in the vertical direction in FIG. 12A, having fulcrum projection members 173a and 173b of a fulcrum member 173 which has its center hole fixedly inserted to the projected part of the bushing 164, as the fulcrum. That is, when the rotating magnetic head 27a undergoes displacement by a certain amount in the upper (or lower) direction in FIG. 12B, the rotating magnetic head 27b undergoes displacement by the same amount as above, in the lower (or upper) direction.

The above rotation of the swinging member 171 indicates the direction of inclination and the amount of inclination according to the size and polarity of the driving current, due to the magnetic force which conforms to the known Fleming's left-hand-rule, generated by the interaction between the driving current passed through the driving coil 144 which is wound around a cylindrical coil winding core inserted in the space in the U-shaped cross-sectional area of the yokes 169a and 169b as shown in FIG. 12B, and the magnetic field due to the permanent magnets 170a and 170b. This rotation of the swinging member 171 is also performed when the swinging member 171 is unitarily rotating with the drum 160.

By this rotational displacement of the swinging member 171, in which the swinging member 171 unitarily rotates with the rotary drum 160, and rotationally displaced by having the fulcrum projections 173a and 173b of the fulcrum member 173 as the fulcrum on a plane which is perpendicular to the rotating plane of the rotary drum 160 by the tracking control voltage supplied from the above driving amplifier 143, the rotating magnetic heads 27a and 27b are rotationally displaced in a direction perpendicular to the track longitudinal direction, respectively and simultaneously in mutually opposite directions. Hence, the magnetic heads accurately and constantly trace and scan on the track which is formed by a rotating magnetic head having the same magnetic direction as their own.

In order for the above continuous tracking control to be performed constantly and properly, it is necessary to maintain the mechanical displacement standard value within a predetermined range. In the case where the displacement quantity to be controlled exceeds the above predetermined range, the rotating magnetic head cannot accurately scan on the track. Accordingly, in the present embodiment, regarding the average error signal component having a long time constant (in the order of seconds) of the tracking error signal, the output signal of the variable pulse generation circuit 75 is fed back to the drum servo circuit as in the above first embodiment, to control the rotational phase of the rotary drum 140.

Moreover, the signal of the phase relative to the rotation of the capstan 31 detected by the capstan pickup head 47, is counted at a counter 145, and this output counted value is applied to a comparator 147. The signal thus applied to the comparator 147 undergoes phase comparison therein with the trapezoidal wave generated by trapezoidal wave generator 146. This trapezoidal wave is synchronized with the control pulse which is reproduced by the control head 52.

Hence, the phase error voltage obtained from the comparator 147 is fed back and applied to the capstan motor 46 through an integrating circuit 148 and a motor driving circuit 149, to control the rotational phase of the capstan motor 46.

The above described operation is for normal reproduction mode, however, according to the present embodiment of the invention, the system is applicable during a so-called variable speed reproduction mode in which the tape travelling speed is set at a different speed from that upon recording, and reproduction of the video track is performed by setting the rotational speed of the rotary drum 140 to the same speed as that upon recording. During the above operation, the pulse used for varying the frequency dividing ratio of the counter 145 according to the special changed speed play mode, can be applied to the pulse counter 145 by use of a special changed speed play mode control switch 150, and constructed to apply a desired pulse to a tracking switching generator 151 upon necessity. The tracking switching pulse is produced from the pulse supplied from a terminal 152 having a period of 1H (pulse rate of H), and the reproduction control pulse supplied from a terminal 153. In the present embodiment of the invention, the track pattern of the magnetic tape 10 being reproduced is a pattern in which the tracking reference signal is of a single frequency having a long wavelength, and recorded in a position different throughout from that recorded in a certain track or the tracking reference signal recorded position on both sides of the tracks which is adjacent to the above certain track, respectively. Therefore, a switching pulse which is used for changing over the tracking polarity is not required. However, when the need arises, the switching pulse supplied from the tracking switching pulse generator 151 can be applied to a mode switch 154 as an open-loop control signal, to multiplex the switching pulse to the tracking error signal.

As described above, according to the present embodiment of the invention, the tracking deviation which is to be subjected to tracking compensation every time the track is scanned, is compensated by the compensation performed in the closed-loop in which the AC component of the tracking error signal is fed back to the head moving mechanism. Furthermore, by feeding back and applying the average value component of the tracking error signal every plurality of tracks to the rotary drum servo system at the same time, a superb tracking servo-control operation is performed having a large control range. Especially upon the so-called variable speed reproduction, the control operation performed by the head moving mechanism, is performed within the mechanically controllable range, and displacement control is performed in which displacement in the direction perpendicular to the track longitudinal direction of the rotating magnetic head by maintaining a predetermined mechanical displacement mean value. Accordingly, a variety of specially reproduced picture can be produced accompanying no noise bar.

Figure 13:
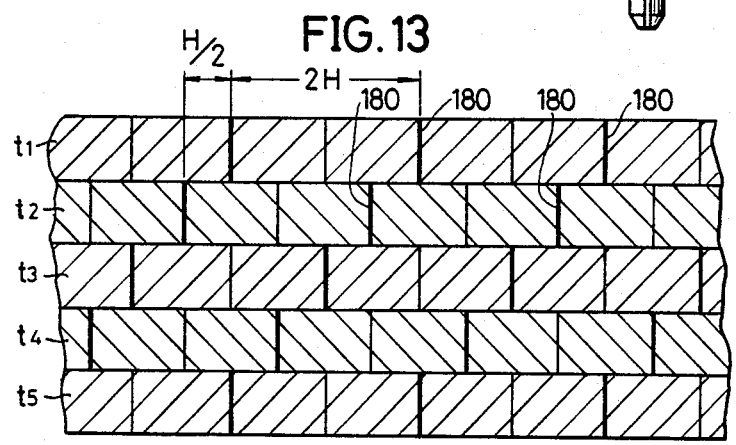
FIG. 13 is a diagram showing another example of a track pattern on the magnetic tape according to the system of the present invention.

In each of the above embodiment of the invention, a tracking reference signal is recorded at a predetermined period portion within the horizontal blanking period every period of 3H, and the reproduced phase is discriminated by reproducing the signal thus recorded, in a magnetic recording and/or reproducing apparatus in which, as shown in FIG. 5, recording is performed by arranging the horizontal synchronizing signal recording position in a direction perpendicular to the track longitudinal direction, in a so-called H-arrangement. However, this invention is not limited to the above described track pattern. In a magnetic recording and/or reproducing apparatus in which recording is performed so that the horizontal synchronizing signal recording position is shifted by H/2 between the adjacent tracks as shown in FIG. 13, the track pattern can be a pattern in which the tracking reference signal is recorded at the horizontal synchronizing signal recording position of every period of 2H, as shown by thick vertical lines 180. The main point is that the magnetic tape should have a track pattern in which the tracking reference signal is recorded at a position in front relative to one track existing in the track longitudinal direction with respect to each of the tracking reference signal recorded position of the two adjacent tracks on both sides of a track, and at the rear relative to another track.

Moreover, the signal which is recorded and reproduced was explained as being a color video signal, however, the signal can of course be a black-and-white video signal, or a signal which is similar to that of a video signal, formed by letting a digital signal obtained by pulse code modulating (PCM) an audio signal and the like together with a composite synchronizing signal of a video signal.

Furthermore, the track pattern of the magnetic tape which can be subjected to recording and/or reproduction, is not limited to those shown in FIGS. 5, 8(A), or 13, in which no guard band exist. As described above, the frequency of the tracking reference signal is selected at a low-frequency band (895 KHz, for example), and can be easily picked up as cross-talk from the adjacent tracks even on a rotating magnetic head having a different azimuth angle. Accordingly, the tracking error signal can be produced even on a magnetic tape having a track pattern which comprises some guard bands.

Further, this invention is not limited to these embodiments but various variations and modifications may be made without departing from the scope of the invention.

What is claimed is:

1. A tracking control system in a magnetic recording and/or reproducing apparatus in which a magnetic head scans a magnetic recording medium to record and/or reproduce a color video signal thereon and/or therefrom, said color video signal comprising a frequency modulated luminance signal, a carrier chrominance signal which is frequency-converted into a frequency band that is lower than a frequency band of said frequency modulated luminance signal, and a plurality of accompanying horizontal synchronizing pulses, each of said horizontal synchronizing pulses having a horizontal blanking period, said tracking control system comprising:

recording means having magnetic head means for successively recording a signal including said horizontal synchronizing pulses on each of a plurality of tracks of said magnetic recording medium, the recorded positions of said horizontal synchronizing pulses being aligned between mutually adjacent ones of said tracks;

tracking reference signal supplying means for supplying to said magnetic head means a tracking reference signal having a single frequency together with said video signal, and single frequency of the tracking reference signal being a frequency within the frequency band of the frequency converted carrier chrominance signal, said tracking reference signal supplying means comprising converting means for converting the horizontal synchronizing pulses into pulses having a period which is three times the horizontal scanning period, and means responsive to said converting means for producing the tracking reference signal with a period of three horizontal scanning periods during a time period excluding a duration in which a color burst signal of the video signal exists, said recording means inserting the reference signal into selected horizontal blanking periods excluding the duration in which the color burst signal exists so that positions of the inserted tracking reference signal are sequentially staggered on adjacent tracks by an interval of one horizontal scanning period;

reproducing means including said magnetic head means for reproducing the recorded tracking reference signal together with said video signal;

reproduced color video signal obtaining means for obtaining a reproduced color video signal from the signals are reproduced by said reproducing means;

gating pulse producing means for producing gating pulses responsive to the reproduced color video signal received from said reproduced color video signal obtaining means, said gating pulses being formed from horizontal synchronizing pulses in the reproduced color video signal and having a pulse width which substantially corresponds to the horizontal blanking period excluding the duration in which the color burst signal exists;

gating means responsive to said gating pulses received from said gating pulse producing means for detecting the tracking reference signal which is reproduced together with the frequency converted carrier chrominance signal by said reproducing means, the detected reproduced tracking reference signal including a tracking reference signal reproduced as crosstalk components from a track which is adjacent to a track which is intended to be scanned by said magnetic head means when a tracking error exists;

discriminating means for discriminating the relative phase difference between the detected reproduced crosstalk components and said detected reproduced tracking reference signal reproduced from said intended track;

tracking error signal deriving means for deriving a tracking error signal from an output signal of said discriminating means; and controlling means for controlling the relative scanning phase of said magnetic head means with respect to the track of said magnetic recording medium by obtaining from the tracking error signal the mean value component of the tracking error signal from each plurality of tracks.

2. A system as described in claim 8 in which said discriminating means comprises a pair of gating means for respectively generating output signals in response to a deviation in the scanning direction of the magnetic head from said intended track, and for generating no output signal when said magnetic head is correctly scanning said intended track, and a pair of detection means for detecting the respective output signals of said pair of gating means, and said tracking error signal deriving means comprises a differential amplifier which receives the outputs of said pair of detection means and produces said tracking error signal as its output signal.

3. A system as described in claim 1, in which said recording means comprises a motor which rotates said magnetic head, and said controlling means controls the rotational phase of said motor by use of said tracking error signal.

4. A system as described in claim 3 which further comprises head moving mechanism for varying the height and position of said magnetic head, and signal supplying means for supplying the instantaneous value component or the AC error signal component obtained from each of the tracks of said tracking error signal to said head moving mechanism.

5. A system as described in claim 4 in which said head moving mechanism comprises a swinging member provided with said magnetic head on both sides thereof, supporting means for supporting said swinging member to enable see-saw operation, and driving means for swinging said swinging member in a see-saw manner according to said supplied AC error signal component.

* * * * *

UNITED STATES PATENT AND TRADEMARK OFFICE
CERTIFICATE OF CORRECTION

PATENT NO. : 4,530,012
DATED : July 16, 1985
INVENTOR(S) : HISAO KINJO

It is certified that error appears in the above-identified patent and that said Letters Patent is hereby corrected as shown below:

Claim 1, Column 17, Line 8, change "and" to --said--

Claim 1, Column 17, Line 32, delete "are"

Signed and Sealed this

Tenth Day of December 1985

[SEAL]

Attest:

DONALD J. QUIGG

Attesting Officer    Commissioner of Patents and Trademarks